(12) United States Patent
Cho et al.

(10) Patent No.: US 8,723,931 B2
(45) Date of Patent: May 13, 2014

(54) STEREOSCOPIC IMAGE DISPLAY

(75) Inventors: Daeho Cho, Paju-si (KR); Byoungchul Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 292 days.

(21) Appl. No.: 13/307,679

(22) Filed: Nov. 30, 2011

(65) Prior Publication Data
US 2012/0154385 A1 Jun. 21, 2012

(30) Foreign Application Priority Data

Dec. 20, 2010 (KR) ........................ 10-2010-0130855

(51) Int. Cl.
*H04N 13/04* (2006.01)
*G06T 15/00* (2011.01)
*G02B 27/22* (2006.01)

(52) U.S. Cl.
USPC ............................. 348/51; 345/419; 359/462

(58) Field of Classification Search
CPC .... H04N 13/04; G02B 27/2214; G06T 19/00; G06T 17/20
USPC ............................. 348/51; 345/419; 359/462
See application file for complete search history.

(56) References Cited

U.S. PATENT DOCUMENTS

2010/0302634 A1* 12/2010 Jung .............................. 359/465

FOREIGN PATENT DOCUMENTS

CN 102316349 A 1/2012

OTHER PUBLICATIONS

Office Action issued in corresponding Chinese Patent Application No. 201110442882.3, mailed Dec. 18, 2013, 12 pages.

* cited by examiner

*Primary Examiner* — Dave Czekaj
*Assistant Examiner* — Tsion B Owens
(74) *Attorney, Agent, or Firm* — Brinks Gilson & Lione

(57) ABSTRACT

A stereoscopic image display includes a display panel, which displays a left eye image on odd-numbered lines and displays a right eye image on even-numbered lines, a patterned retarder including a first retarder passing through first polarized light of the left eye image and a second retarder passing through second polarized light of the right eye image, polarized glasses including a left eye polarizing filter and a right eye polarizing filter, and a 3D formatter, which receives 3D image data from a host system, assigns left eye image data of the 3D image data to the odd-numbered lines, and assign right eye image data of the 3D image data to the even-numbered lines.

16 Claims, 15 Drawing Sheets

| |
|---|
| (1L+2L)/2 |
| (2R+3R)/2 |
| (3L+4L)/2 |
| (4R+5R)/2 |
| ⋮ |
| (1079L+1080L)/2 |
| 1080R |

FIG. 2A

(RELATED ART)

| | |
|---|---|
| 1L | 1R |
| 2L | 2R |
| 3L | 3R |
| 4L | 4R |
| ⋮ | ⋮ |
| 1079L | 1079R |
| 1080L | 1080R |

FIG. 2B

(RELATED ART)

| |
|---|
| 1L |
| 2R |
| 3L |
| 4R |
| ⋮ |
| 1079L |
| 1080R |

FIG. 5A

| | |
|---|---|
| 1L | 1R |
| 2L | 2R |
| 3L | 3R |
| 4L | 4R |
| ⋮ | ⋮ |
| 1079L | 1079R |
| 1080L | 1080R |

FIG. 5B

| |
|---|
| (1L+2L)/2 |
| (2R+3R)/2 |
| (3L+4L)/2 |
| (4R+5R)/2 |
| ⋮ |
| (1079L+1080L)/2 |
| 1080R |

FIG. 5C

| 1L |
|---|
| (1R+2R)/2 |
| (2L+3L)/2 |
| (3R+4R)/2 |
| ⋮ |
| (1078L+1079L)/2 |
| (1079R+1080R)/2 |

FIG. 6A

| | |
|---|---|
| 1L | 1R |
| 2L | 2R |
| 3L | 3R |
| 4L | 4R |
| ⋮ | ⋮ |
| 1079L | 1079R |
| 1080L | 1080R |

FIG. 6B

| |
|---|
| (2 × 1L+2L) /3 |
| (1R+2 × 2R+3R) /4 |
| (2L+2 × 3L+4L) /4 |
| (3R+2 × 4R+5R) /4 |
| ⋮ |
| (1078L+2 × 1079L+1080L) /4 |
| (1079R+2 × 1080R) /3 |

FIG. 7A

| | |
|---|---|
| 1L | 1R |
| 2L | 2R |
| 3L | 3R |
| 4L | 4R |
| ⋮ | ⋮ |
| 1079L | 1079R |
| 1080L | 1080R |

FIG. 7B

| |
|---|
| (4 × 1L+2L) /5 |
| (4 × 1R+4 × 2R+3R) /9 |
| (1L+4 × 2L+4 × 3L+4L) /10 |
| (2R+4 × 3R+4 × 4R+5R) /10 |
| ⋮ |
| (1077L+4 × 1078L+4 × 1079L+1080L) /10 |
| (1078R+4 × 1079R+4 × 1080R) /9 |

FIG. 7C

| |
|---|
| (4 × 1L+4 × 2L+3L) /9 |
| (1R+4 × 2R+4 × 3R+4R) /10 |
| (2L+4 × 3L+4 × 4L+5L) /10 |
| (3R+4 × 4R+4 × 5R+6R) /10 |
| ⋮ |
| (1078L+4 × 1079L+4 × 1080L) /9 |
| (1079R+4 × 1080R) /5 |

FIG. 8A

| | |
|---|---|
| 1L | 1R |
| 2L | 2R |
| 3L | 3R |
| 4L | 4R |
| ⋮ | ⋮ |
| 1079L | 1079R |
| 1080L | 1080R |

FIG. 8B

| |
|---|
| (4 × 1L+2 × 2L+3L)/7 |
| (2 × 1R+4 × 2R+2 × 3R+4R)/9 |
| (1L+2 × 2L+4 × 3L+2 × 4L+5L)/10 |
| (2R+2 × 3R+4 × 4R+2 × 5R+6R)/10 |
| ⋮ |
| (1077L+2 × 1078L+4 × 1079L+2 × 1080L)/9 |
| (1078R+2 × 1079R+4 × 1080R)/7 |

STEREOSCOPIC IMAGE DISPLAY

This application claims the priority and the benefit under 35 U.S.C. §119(a) on Patent Application No. 10-2010-0130855 filed in Republic of Korea on Dec. 20, 2010 the entire contents of which are hereby incorporated by reference.

BACKGROUND

1. Field of the Invention

Embodiments of the invention relate to a stereoscopic image display.

2. Discussion of the Related Art

A stereoscopic image display implements a three-dimensional (3D) image using a stereoscopic technique or an autostereoscopic technique. The stereoscopic technique, which uses a parallax image between left and right eyes of a user with a high stereoscopic effect, includes a glasses type method and a non-glasses type method, both of which have been put on the market. In the glasses type method, a stereoscopic image is implemented on a direct-view display or a projector using polarized glasses by varying a polarization direction of the parallax image between the left and right eyes. Alternatively, the stereoscopic image is implemented on the direct-view display or the projector using liquid crystal shutter glasses by displaying the parallax image between the left and right eyes in a time-division manner. In the non-glasses type method, an optical axis of the parallax image between the left and right eyes is generally separated using an optical plate such as a parallax barrier and a lenticular lens, and thus the stereoscopic image is implemented.

FIG. 1 schematically illustrates a method for implementing a stereoscopic image by a related art patterned retarder type stereoscopic image display. As shown in FIG. 1, the patterned retarder type stereoscopic image display implements a stereoscopic image using polarization characteristic of a patterned retarder PR disposed on a display panel DIS and polarization characteristic of polarized glasses PG a user wears. The patterned retarder type stereoscopic image display displays a left eye image on odd-numbered lines of the display panel DIS and displays a right eye image on even-numbered lines of the display panel DIS. The left eye image passes through the patterned retarder PR and thus is converted into left-circularly polarized light. The right eye image passes through the patterned retarder PR and thus is converted into right-circularly polarized light. A left eye polarizing filter of the polarized glasses PG passes through only the left-circularly polarized light, and a right eye polarizing filter of the polarized glasses PG passes through only the right-circularly polarized light. Thus, the user views only the left eye image through his or her left eye and views only the right eye image through his/her right eye.

FIGS. 2A and 2B illustrate 3D image data input or output to a 3D formatter. More specifically, FIGS. 2A and 2B illustrate the 3D image data when a vertical resolution of a display panel is 1080. As shown in FIGS. 2A and 2B, a patterned retarder type stereoscopic image display converts the format of the 3D image data, so that the patterned retarder type stereoscopic image display can implement the 3D image data input using the 3D formatter in a patterned retarder manner. As shown in FIG. 2A, left eye image data 1L, 2L, 3L, 4L, . . . , 1079L, and 1080L of 1st to 1080th lines are input to the left half of the 3D image data input to the 3D formatter, and right eye image data 1R, 2R, 3R, 4R, . . . , 1079R, and 1080R of the 1st to 1080th lines are input to the right half of the 3D image data. As shown in FIG. 2B, in the patterned retarder manner, the 3D formatter arranges the left eye image data on odd-numbered lines and arranges the right eye image data on even-numbered lines to output the 3D image data. The display panel receives the 3D image data, whose the format is converted by the 3D formatter, and displays only a left eye image on the odd-numbered lines and only a right eye image on the even-numbered lines.

Because the patterned retarder type stereoscopic image display displays only the left eye image on the odd-numbered lines and only the right eye image on the even-numbered lines, a boundary of the 3D image is not smooth and may look like steps (step phenomenon). The step phenomenon is known as jagging, jagness, or zigzag artifact. In the following description, the step phenomenon is referred to as jagging.

BRIEF SUMMARY

A stereoscopic image display includes a display panel configured to display a left eye image on odd-numbered lines and display a right eye image on even-numbered lines, a patterned retarder including a first retarder passing through first polarized light of the left eye image and a second retarder passing through second polarized light of the right eye image, polarized glasses including a left eye polarizing filter and a right eye polarizing filter, the left eye polarizing filter passing through the first polarized light, the right eye polarizing filter passing through the second polarized light, and a 3D formatter configured to receive 3D image data from a host system, assign left eye image data of the 3D image data to the odd-numbered lines, and assign right eye image data of the 3D image data to the even-numbered lines, wherein the 3D formatter converts left eye image data of an nth line by calculating left eye image data of at least two neighboring lines including the nth line using a predetermined weight value, where n is a natural number, wherein the 3D formatter converts right eye image data of an (n+1)th line by calculating right eye image data of at least two neighboring lines including the (n+1)th line using the predetermined weight value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 2A and 2B illustrate 3D image data input or output to a 3D formatter;

FIGS. 5A to 5C illustrate a 3D format method according to a first embodiment of the invention;

FIGS. 6A and 6B illustrate a 3D format method according to a second embodiment of the invention;

FIGS. 7A to 7C illustrate a 3D format method according to a third embodiment of the invention;

FIGS. 8A and 8B illustrate a 3D format method according to a fourth embodiment of the invention.

DETAILED DESCRIPTION OF THE DRAWINGS AND THE PRESENTLY PREFERRED EMBODIMENTS

Reference will now be made in detail to the specific embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the invention.

Figure 1:
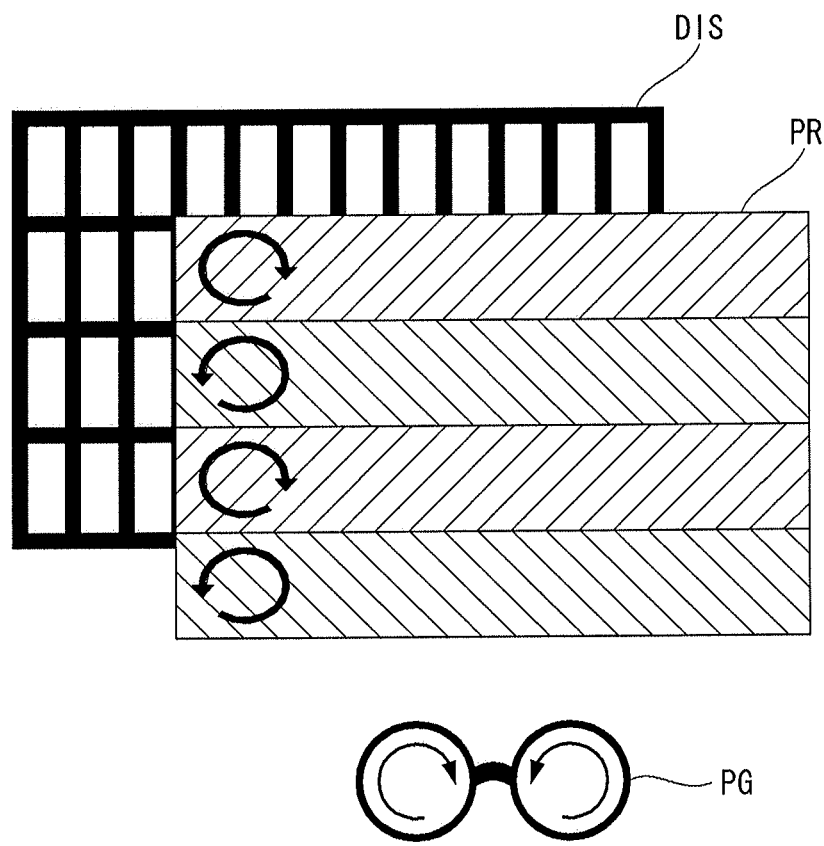
FIG. 1 schematically illustrates a method for implementing a stereoscopic image by a related art patterned retarder type stereoscopic image display.
Figure 3:
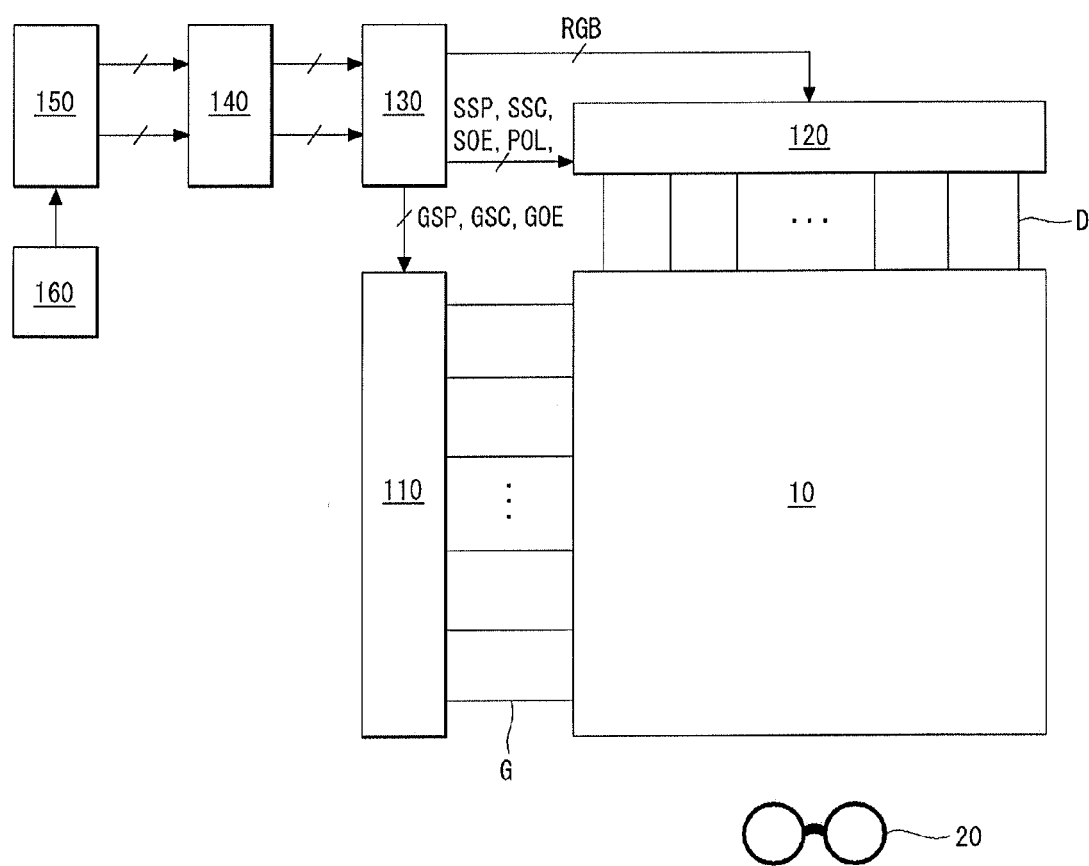
FIG. 3 is a block diagram schematically illustrating a stereoscopic image display according to an exemplary embodiment of the invention.
Figure 4:
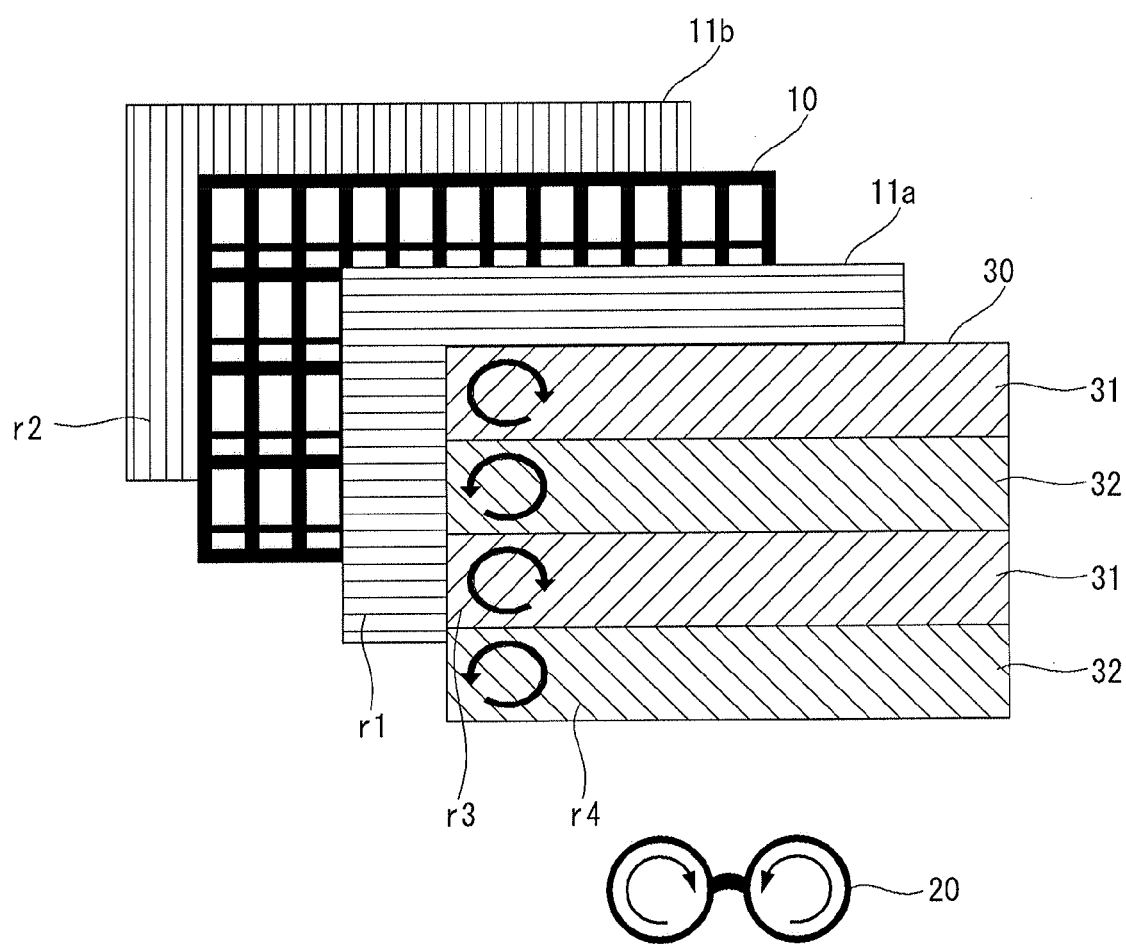
FIG. 4 is an exploded perspective view illustrating a display panel, a patterned retarder, and polarized glasses.

FIG. 3 is a block diagram schematically illustrating a stereoscopic image display according to an exemplary embodiment of the invention. FIG. 4 is an exploded perspective view illustrating a display panel, a patterned retarder, and polarized glasses. The stereoscopic image display according to the embodiment of the invention may be implemented as a flat panel display such as a liquid crystal display (LCD), a field emission display (FED), a plasma display panel (PDP) display, and an organic light emitting diode (OLED) display. In the following description, the embodiment of the invention describes the liquid crystal display as an example of the stereoscopic image display. Other kinds of flat panel displays may be used.

As shown in FIGS. 3 and 4, the stereoscopic image display according to the embodiment of the invention includes a display panel 10, polarized glasses 20, a gate driver 110, a data driver 120, a timing controller 130, a scaler 140, a host system 150, and the like. The display panel 10 displays an image under the control of the timing controller 130. The display panel 10 includes a thin film transistor (TFT) substrate, a color filter substrate, and a liquid crystal layer between the TFT substrate and the color filter substrate.

Data lines D and gate lines (or scan lines) G crossing the data lines D are formed on the TFT substrate, and a plurality of liquid crystal cells are arranged in a plurality of cell regions defined by the data lines D and the gate lines G in a matrix form. A TFT formed at each of crossings of the data lines D and the gate lines G transfers a data voltage supplied via the data line D to a pixel electrode of the liquid crystal cell in response to a gate pulse received through the gate line G. For this, a gate electrode of the TFT is connected to the gate line G, a source electrode of the TFT is connected to the data line D, and a drain electrode of the TFT is connected to the pixel electrode of the liquid crystal cell and a storage capacitor. The storage capacitor holds the data voltage transferred to the pixel electrode for a predetermined time until a next data voltage enters. A common voltage is supplied to a common electrode opposite the pixel electrode.

The color filter substrate includes black matrixes and color filters. The common electrode is formed on the color filter substrate in a vertical electric field driving manner such as a twisted nematic (TN) mode and a vertical alignment (VA) mode. The common electrode is formed on the TFT substrate along with the pixel electrode in a horizontal electric field driving manner such as an in-plane switching (IPS) mode and a fringe field switching (FFS) mode.

As shown in FIG. 4, an upper polarizing plate 11a is attached to the color filter substrate of the display panel 10, and a lower polarizing plate 11b is attached to the TFT substrate of the display panel 10. A light transmission axis r1 of the upper polarizing plate 11a is perpendicular to a light transmission axis r2 of the lower polarizing plate 11b. Alignment layers for setting pre-tilt angles of liquid crystals are respectively formed on the TFT substrate and the color filter substrate. A spacer is formed between the TFT substrate and the color filter substrate of the display panel 10 so as to provide a cell gap of the liquid crystal layer. The display panel 10 may be implemented in any liquid crystal mode as well as the TN, VA, IPS, and FFS modes.

The display panel 10 displays a two-dimensional (2D) image on odd-numbered lines and even-numbered lines thereof in a 2D mode. The display panel 10 displays a left or right eye image on the odd-numbered lines and displays a right or left eye image on the even-numbered lines in a three-dimensional (3D) mode. Light of the image displayed on the display panel 10 is incident on a patterned retarder 30 disposed on the display panel 10 through an upper polarizing film.

First retarders 31 are formed on odd-numbered lines of the patterned retarder 30, and second retarders 32 are formed on even-numbered lines of the patterned retarder 30. Thus, the odd-numbered lines of the display panel 10 are opposite to the first retarders 31 on the odd-numbered lines of the patterned retarder 30, and the even-numbered lines of the display panel 10 are opposite to the second retarders 32 on the even-numbered lines of the patterned retarder 30.

The first retarders 31 retard a phase of light from the display panel 10 by $+\lambda/4$, where $\lambda$ is a wavelength of light. The second retarders 32 retard a phase of the light from the display panel 10 by $-\lambda/4$. An optical axis r3 of the first retarder 31 is perpendicular to an optical axis r4 of the second retarder 32. The first retarders 31 may be configured so as to pass through only first circularly polarized light (for example, left-circularly polarized light), and the second retarders 32 may be configured so as to pass through only second circularly polarized light (for example, right-circularly polarized light).

The patterned retarder 30 may include a black stripe for widening a vertical viewing angle. Alternatively, the patterned retarder 30 may not include the black stripe and may use some of the pixels of the display panel 10 as an active black stripe.

A left eye polarizing filter of the polarized glasses 20 has the same optical axis as the first retarder 31 of the patterned retarder 30, and a right eye polarizing filter of the polarized glasses 20 has the same optical axis as the second retarder 32 of the patterned retarder 30. For example, a left circular polarizing filter may be selected as the left eye polarizing filter of the polarized glasses 20, and a right circular polarizing filter may be selected as the right eye polarizing filter of the polarized glasses 20. A user has to wear the polarized glasses 20 when viewing a 3D image, and has to remove the polarized glasses 20 when viewing a 2D image.

In other words, in the stereoscopic image display according to the embodiment of the invention, the left eye image displayed on the odd-numbered lines of the display panel 10 is transmitted by the first retarders 31 and is converted into left-circularly polarized light. Further, the right eye image displayed on the even-numbered lines of the display panel 10 is transmitted by the second retarders 32 and is converted into right-circularly polarized light. The left-circularly polarized light is transmitted by the left eye polarizing filter of the polarized glasses 20 and reaches the user's left eye. The right-circularly polarized light is transmitted by the right eye polarizing filter of the polarized glasses 20 and reaches the user's right eye. Thus, the user views only the left eye image through his or her left eye and views only the right eye image through his/her right eye.

The data driver 120 includes a plurality of source driver integrated circuits (ICs). The source driver ICs convert image data RGB received from the timing controller 130 into positive and negative gamma compensation voltages and generate positive and negative analog data voltages. The source driver ICs then supply the positive and negative analog data voltages to the data lines D of the display panel 10.

The gate driver 110 includes a plurality of gate driver ICs. Each of the gate driver ICs includes a shift register, a level shifter for converting an output signal of the shift register into a signal having a swing width suitable for a TFT drive of the liquid crystal cell, an output buffer, and the like. The gate driver 110 sequentially supplies a gate pulse synchronized with the data voltage to the gate lines G of the display panel 10 under the control of the timing controller 130.

A hold type display element requiring a backlight unit may be selected as the display panel 10. A backlit liquid crystal display panel modulating light from the backlight unit may be generally implemented as the hold type display element. The backlight unit includes a plurality of light sources, that are turned on based on a driving current supplied by a backlight unit driver, a light guide plate (or a diffusion plate), a plurality of optical sheets, and the like. The backlight unit may be implemented as one of an edge type backlight unit and a direct type backlight unit. The light sources of the backlight unit may include one or at least two of a hot cathode fluorescent lamp (HCFL), a cold cathode fluorescent lamp (CCFL), an external electrode fluorescent lamp (EEFL), and a light emitting diode (LED). The backlight unit driver generates the driving current for turning on the light sources of the backlight unit. The backlight unit driver switches on or off the driving current supplied to the light sources under the control of the timing controller 130.

The timing controller 130 outputs a gate control signal for controlling the gate driver 110 to the gate driver 110 and outputs a data control signal for controlling the data driver 120 to the data driver 120 based on image data RGB and timing signals (including a vertical sync signal, a horizontal sync signal, a data enable, a dot clock, etc.), that are output from the scaler 140. The gate control signal includes a gate start pulse GSP, a gate shift clock GSC, a gate output enable GOE, and the like. The gate start pulse GSP controls a timing of a first gate pulse. The gate shift clock GSC shifts the gate start pulse GSP. The gate output enable GOE controls an output timing of the gate driver 110.

The data control signal includes a source start pulse SSP, a source sampling clock SSC, a polarity control signal POL, a source output enable SOE, and the like. The source start pulse SSP controls a data sampling start time point of the data driver 120. The source sampling clock SSC controls a sampling operation of the data driver 120 based on a rising or falling edge thereof. If digital video data to be input to the data driver 120 is transferred based on a mini low voltage differential signaling (LVDS) interface standard, the source start pulse SSP and the source sampling clock SSC may be omitted. The polarity control signal POL inverts a polarity of the data voltage output by the data driver 120 every L horizontal periods, where L is a natural number. The source output enable SOE controls an output timing of the data driver 120.

The host system 150 supplies the image data RGB to the scaler 140 through an interface such as an LVDS interface and a transition minimized differential signaling (TMDS) interface. Further, the host system 150 supplies the timing signals and a mode signal MODE for distinguishing between the 2D mode and the 3D mode to the scaler 140.

The user may receive a 3D image selection mode through a user input device 160. The user input device 160 includes a touch screen, an on-screen display (OSD), a keyboard, a mouse, a remote controller, etc. that are attached to or mounted inside the display panel 10. The 3D image selection mode is an option capable of selecting a 3D formatted image, which is converted using 3D format methods according to first to fourth embodiments of the invention. The 3D image selection mode is described in detail with reference to FIGS. 9A to 9E.

The scaler 140 receives the image data RGB from the host system 150, converts the image data RGB based on the image quality and a resolution of the display panel 10, and outputs the converted image data RGB. In particular, the scaler 140 includes a 3D formatter for converting a format of 3D image data, so that the image data RGB can be implemented in a patterned retarder manner in the 3D mode. When the 3D image data is received from the host system 150, the 3D formatter assigns left eye image data to the odd-numbered lines of the display panel 10 and assigns right eye image data to the even-numbered lines of the display panel 10. The 3D formatter converts left eye image data of an nth line by calculating left eye image data of at least two neighboring lines including the nth line using a predetermined weight value, where n is a natural number. Also, the 3D formatter converts right eye image data of an (n+1)th line by calculating right eye image data of at least two neighboring lines including the (n+1)th line using the predetermined weight value. Further, the 3D formatter selects the at least two neighboring lines including the nth line or the (n+1)th line based on the 3D image selection mode selected through the user input device. The 3D format method of the 3D formatter according to the embodiment of the invention is described in detail below with reference to FIGS. 5 to 8.

FIGS. 5A to 5C illustrate a 3D format method according to a first embodiment of the invention. More specifically, FIGS. 5A to 5C illustrate the 3D format method when a vertical resolution of the display panel is 1080.

As shown in FIG. 5A, left eye image data 1L, 2L, 3L, 4L, . . . , 1079L, and 1080L of 1st to 1080th lines are input to the left half of the 3D image data input to the 3D formatter, and right eye image data 1R, 2R, 3R, 4R, . . . , 1079R, and 1080R of the 1st to 1080th lines are input to the right half of the 3D image data.

As shown in FIG. 5B, the 3D formatter outputs the left eye image data to the odd-numbered lines of the display panel 10 and outputs the right eye image data to the even-numbered lines of the display panel 10. In particular, the 3D formatter outputs left eye image data of the nth line using left eye image data of nth and (n+1)th lines and outputs right eye image data of the (n+1)th line using right eye image data of the (n+1)th and (n+2)th lines. For example, the 3D formatter outputs an average value of the left eye image data 1L and 2L of the first and second lines as left eye image data 1L of the first line and outputs an average value of the right eye image data 2R and 3R of the second and third lines as right eye image data 2R of the second line. In this instance, the 3D formatter outputs the right eye image data 1080R of the 1080th line as right eye image data of the 1080th line without the calculation.

FIG. 5B illustrates the 3D format method of the 3D formatter, which outputs an average value of the left eye image data of the nth and (n+1)th lines as the left eye image data of the nth line and outputs an average value of the right eye image data of the (n+1)th and (n+2)th lines as the right eye image data of the (n+1)th line. Other 3D format methods may be used in the embodiment of the invention. For example, the 3D formatter may output a value obtained by calculating the left eye image data of the nth and (n+1)th lines using a weight value x:y as the left eye image data of the nth line, where x and y are a positive integer. Further, the 3D formatter may output a value obtained by calculating the right eye image data of the (n+1)th and (n+2)th lines using the weight value x:y as the right eye image data of the (n+1)th line. Namely, the weight value in the 3D format method illustrated in FIG. 5B is 1:1, and the weight value in the 3D format method may vary.

In other words, as shown in FIG. 5B, the embodiment of the invention converts the left eye image data of the nth line using the left eye image data of the nth and (n+1)th lines and converts the right eye image data of the (n+1)th line using the right eye image data of the (n+1)th and (n+2)th lines. Then, the embodiment of the invention arranges the left eye image data on the odd-numbered lines of the display panel and arranges the right eye image data on the even-numbered lines of the display panel. As a result, the embodiment of the invention may reflect the non-displayed left eye image data of the even-numbered lines on the displayed left eye image data of the odd-numbered lines and may reflect the non-displayed right eye image data of the odd-numbered lines on the displayed right eye image data of the even-numbered lines. Thus, the embodiment of the invention may smoothly represent a boundary of the 3D image and may prevent jagging of the 3D image.

As shown in FIG. 5C, the 3D formatter outputs left eye image data of the nth line using left eye image data of (n−1)th and nth lines and outputs right eye image data of the (n+1)th line using right eye image data of the nth and (n+1)th lines. For example, the 3D formatter outputs an average value of the right eye image data 1R and 2R of the first and second lines as right eye image data 2R of the second line and outputs an average value of the left eye image data 2L and 3L of the second and third lines as left eye image data 3L of the third line. In this instance, the 3D formatter outputs the left eye image data 1L of the first line as left eye image data of the first line without the calculation.

FIG. 5C illustrates the 3D format method of the 3D formatter, which outputs an average value of the left eye image data of the (n−1)th and nth lines as the left eye image data of the nth line and outputs an average value of the right eye image data of the nth and (n+1)th lines as the right eye image data of the (n+1)th line. Other 3D format methods may be used in the embodiment of the invention. For example, the 3D formatter may output a value obtained by calculating the left eye image data of the (n−1)th and nth lines using the weight value x:y as the left eye image data of the nth line. Further, the 3D formatter may output a value obtained by calculating the right eye image data of the nth and (n+1)th lines using the weight value x:y as the right eye image data of the (n+1)th line. Namely, the weight value in the 3D format method illustrated in FIG. 5C is 1:1, and the weight value in the 3D format method may vary.

In other words, as shown in FIG. 5C, the embodiment of the invention converts the left eye image data of the nth line using the left eye image data of the (n−1)th and nth lines and converts the right eye image data of the (n+1)th line using the right eye image data of the nth and (n+1)th lines. Then, the embodiment of the invention arranges the left eye image data on the odd-numbered lines of the display panel and arranges the right eye image data on the even-numbered lines of the display panel. As a result, the embodiment of the invention may reflect the non-displayed left eye image data of the even-numbered lines on the displayed left eye image data of the odd-numbered lines and may reflect the non-displayed right eye image data of the odd-numbered lines on the displayed right eye image data of the even-numbered lines. Thus, the embodiment of the invention may smoothly represent the boundary of the 3D image and may prevent the jagging of the 3D image.

FIGS. 6A and 6B illustrate a 3D format method according to a second embodiment of the invention. More specifically, FIGS. 6A and 6B illustrate the 3D format method when a vertical resolution of the display panel is 1080.

As shown in FIG. 6A, left eye image data 1L, 2L, 3L, 4L, . . . , 1079L, and 1080L of 1st to 1080th lines are input to the left half of the 3D image data input to the 3D formatter, and right eye image data 1R, 2R, 3R, 4R, . . . , 1079R, and 1080R of the 1st to 1080th lines are input to the right half of the 3D image data.

As shown in FIG. 6B, the 3D formatter outputs the left eye image data to the odd-numbered lines of the display panel 10 and outputs the right eye image data to the even-numbered lines of the display panel 10. In particular, the 3D formatter outputs left eye image data of the nth line using left eye image data of the (n−1)th, nth, and (n+1)th lines and outputs right eye image data of the (n+1)th line using right eye image data of the nth, (n+1)th, and (n+2)th lines.

For example, as shown in FIG. 6B, the 3D formatter outputs a value obtained by calculating the right eye image data 1R, 2R, and 3R of the first, second, and third lines using a weight value 1:2:1 as right eye image data 2R of the second line. Further, the 3D formatter outputs a value obtained by calculating the left eye image data 2L, 3L, and 4L of the second, third, and fourth lines using the weight value 1:2:1 as left eye image data 3L of the third line. In this instance, the 3D formatter outputs a value obtained by calculating the left eye image data 1L and 2L of the first and second lines using a weight value 2:1 as left eye image data 1L of the first line. Further, the 3D formatter outputs a value obtained by calculating the right eye image data 1079R and 1080R of the 1079th and 1080th lines using a weight value 1:2 as right eye image data 1080R of the 1080th line.

FIG. 6B illustrates the 3D format method of the 3D formatter, which outputs a value obtained by calculating the left eye image data of the (n−1)th, nth, and (n+1)th lines using the weight value 1:2:1 as left eye image data of the nth line and outputs a value obtained by calculating the right eye image data of the nth, (n+1)th, and (n+2)th lines using the weight value 1:2:1 as right eye image data of the (n+1)th line. Other weight values may be used. Namely, the 3D formatter may output a value obtained by calculating the left eye image data of the (n−1)th, nth, and (n+1)th lines using a weight value x:y:z (where x, y, and z are a positive number) as left eye image data of the nth line and may output a value obtained by calculating the right eye image data of the nth, (n+1)th, and (n+2)th lines using the weight value x:y:z as right eye image data of the (n+1)th line.

In other words, as shown in FIG. 6B, the embodiment of the invention converts the left eye image data of the nth line using the left eye image data of the (n−1)th, nth, and (n+1)th lines and converts the right eye image data of the (n+1)th line using the right eye image data of the nth, (n+1)th, and (n+2)th lines. Then, the embodiment of the invention arranges the left eye image data on the odd-numbered lines of the display panel and arranges the right eye image data on the even-numbered lines of the display panel. As a result, the embodiment of the invention may reflect the non-displayed left eye image data of the even-numbered lines on the displayed left eye image data of the odd-numbered lines and may reflect the non-displayed right eye image data of the odd-numbered lines on the displayed right eye image data of the even-numbered lines. Thus, the embodiment of the invention may smoothly represent the boundary of the 3D image and may prevent the jagging of the 3D image.

FIGS. 7A to 7C illustrate a 3D format method according to a third embodiment of the invention. More specifically, FIGS.

7A to 7C illustrate the 3D format method when a vertical resolution of the display panel is 1080.

As shown in FIG. 7A, left eye image data 1L, 2L, 3L, 4L, . . . , 1079L, and 1080L of 1st to 1080th lines are input to the left half of the 3D image data input to the 3D formatter, and right eye image data 1R, 2R, 3R, 4R, . . . , 1079R, and 1080R of the 1st to 1080th lines are input to the right half of the 3D image data.

As shown in FIG. 7B, the 3D formatter outputs the left eye image data to the odd-numbered lines of the display panel 10 and outputs the right eye image data to the even-numbered lines of the display panel 10. In particular, the 3D formatter outputs left eye image data of the nth line using left eye image data of the (n−2)th, (n−1)th, nth, and (n+1)th lines and outputs right eye image data of the (n+1)th line using right eye image data of the (n−1)th, nth, (n+1)th, and (n+2)th lines.

For example, as shown in FIG. 7B, the 3D formatter outputs a value obtained by calculating the left eye image data 1L, 2L, 3L, and 4L of the first, second, third, and fourth lines using a weight value 1:4:4:1 as left eye image data 3L of the third line. Further, the 3D formatter outputs a value obtained by calculating the right eye image data 2R, 3R, 4R, and 5R of the second, third, fourth, and fifth lines using the weight value 1:4:4:1 as right eye image data 4R of the fourth line. In this instance, the 3D formatter outputs a value obtained by calculating the left eye image data 1L and 2L of the first and second lines using a weight value 4:1 as left eye image data 1L of the first line. The 3D formatter outputs a value obtained by calculating the right eye image data 1R, 2R, and 3R of the first, second, and third lines using a weight value 4:4:1 as right eye image data 2R of the second line. The 3D formatter outputs a value obtained by calculating the right eye image data 1078R, 1079R, and 1080R of the 1078th, 1079th, and 1080th lines using a weight value 1:4:4 as right eye image data 1080R of the 1080th line.

FIG. 7B illustrates the 3D format method of the 3D formatter, which outputs a value obtained by calculating the left eye image data of the (n−2)th, (n−1)th, nth, and (n+1)th lines using the weight value 1:4:4:1 as left eye image data of the nth line and outputs a value obtained by calculating the right eye image data of the (n−1)th, nth, (n+1)th, and (n+2)th lines using the weight value 1:4:4:1 as right eye image data of the (n+1)th line. Other weight values may be used. Namely, the 3D formatter may output a value obtained by calculating the left eye image data of the (n−2)th, (n−1)th, nth, and (n+1)th lines using a weight value w:x:y:z (where w, x, y, and z are a positive number) as left eye image data of the nth line and may output a value obtained by calculating the right eye image data of the (n−1)th, nth, (n+1)th, and (n+2)th lines using the weight value w:x:y:z as right eye image data of the (n+1)th line.

In other words, as shown in FIG. 7B, the embodiment of the invention converts the left eye image data of the nth line using the left eye image data of the (n−2)th, (n−1)th, nth, and (n+1)th lines and converts the right eye image data of the (n+1)th line using the right eye image data of the (n−1)th, nth, (n+1)th, and (n+2)th lines. Then, the embodiment of the invention arranges the left eye image data on the odd-numbered lines of the display panel and arranges the right eye image data on the even-numbered lines of the display panel. As a result, the embodiment of the invention may reflect the non-displayed left eye image data of the even-numbered lines on the displayed left eye image data of the odd-numbered lines and may reflect the non-displayed right eye image data of the odd-numbered lines on the displayed right eye image data of the even-numbered lines. Thus, the embodiment of the invention may smoothly represent the boundary of the 3D image and may prevent the jagging of the 3D image.

As shown in FIG. 7C, the 3D formatter outputs left eye image data of the nth line using left eye image data of the (n−1)th, nth, (n+1)th, and (n+2)th lines and outputs right eye image data of the (n+1)th line using right eye image data of the nth, (n+1)th, (n+2)th, and (n+3)th lines.

For example, as shown in FIG. 7C, the 3D formatter outputs a value obtained by calculating the right eye image data 1R, 2R, 3R, and 4R of the first, second, third, and fourth lines using a weight value 1:4:4:1 as right eye image data of the second line. Further, the 3D formatter outputs a value obtained by calculating the left eye image data 2L, 3L, 4L, and 5L of the second, third, fourth, and fifth lines using the weight value 1:4:4:1 as left eye image data of the third line. In this instance, the 3D formatter outputs a value obtained by calculating the left eye image data 1L, 2L, and 3L of the first, second, and third lines using a weight value 4:4:1 as left eye image data of the first line. The 3D formatter outputs a value obtained by calculating the left eye image data 1078L, 1079L, and 1080L of the 1078th, 1079th, and 1080th lines using the weight value 4:4:1 as left eye image data of the 1079th line. The 3D formatter outputs a value obtained by calculating the right eye image data 1079R and 1080R of the 1079th and 1080th lines using a weight value 4:1 as right eye image data of the 1080th line.

FIG. 7C illustrates the 3D format method of the 3D formatter, which outputs a value obtained by calculating the left eye image data of the (n−1)th, nth, (n+1)th, and (n+2)th lines using the weight value 1:4:4:1 as left eye image data of the nth line and outputs a value obtained by calculating the right eye image data of the nth, (n+1)th, (n+2)th, and (n+3)th lines using the weight value 1:4:4:1 as right eye image data of the (n+1)th line. Other weight values may be used. Namely, the 3D formatter may output a value obtained by calculating the left eye image data of the (n−1)th, nth, (n+1)th, and (n+2)th lines using a weight value w:x:y:z (where w, x, y, and z are a positive number) as left eye image data of the nth line and may output a value obtained by calculating the right eye image data of the nth, (n+1)th, (n+2)th, and (n+3)th lines using the weight value w:x:y:z as right eye image data of the (n+1)th line.

In other words, as shown in FIG. 7C, the embodiment of the invention converts the left eye image data of the nth line using the left eye image data of the (n−1)th, nth, (n+1)th, and (n+2)th lines and converts the right eye image data of the (n+1)th line using the right eye image data of the nth, (n+1)th, (n+2)th, and (n+3)th lines. Then, the embodiment of the invention arranges the left eye image data on the odd-numbered lines of the display panel and arranges the right eye image data on the even-numbered lines of the display panel. As a result, the embodiment of the invention may reflect the non-displayed left eye image data of the even-numbered lines on the displayed left eye image data of the odd-numbered lines and may reflect the non-displayed right eye image data of the odd-numbered lines on the displayed right eye image data of the even-numbered lines. Thus, the embodiment of the invention may smoothly represent the boundary of the 3D image and may prevent the jagging of the 3D image.

FIGS. 8A and 8B illustrate a 3D format method according to a fourth embodiment of the invention. More specifically, FIGS. 8A and 8B illustrate the 3D format method when a vertical resolution of the display panel is 1080.

As shown in FIG. 8A, left eye image data 1L, 2L, 3L, 4L, . . . , 1079L, and 1080L of 1st to 1080th lines are input to the left half of the 3D image data input to the 3D formatter, and right eye image data 1R, 2R, 3R, 4R, ..., 1079R, and 1080R of the 1st to 1080th lines are input to the right half of the 3D image data.

As shown in FIG. 8B, the 3D formatter outputs the left eye image data to the odd-numbered lines of the display panel 10 and outputs the right eye image data to the even-numbered lines of the display panel 10. In particular, the 3D formatter outputs left eye image data of the nth line using left eye image data of the (n−2)th, (n−1)th, nth, (n+1)th, and (n+2)th lines and outputs right eye image data of the (n+1)th line using right eye image data of the (n−1)th, nth, (n+1)th, (n+2)th, and (n+3)th lines.

For example, as shown in FIG. 8B, the 3D formatter outputs a value obtained by calculating the left eye image data 1L, 2L, 3L, 4L, and 5L of the first, second, third, fourth, and fifth lines using a weight value 1:2:4:2:1 as left eye image data 3L of the third line. Further, the 3D formatter outputs a value obtained by calculating the right eye image data 2R, 3R, 4R, 5R, and 6R of the second, third, fourth, fifth, and sixth lines using the weight value 1:2:4:2:1 as right eye image data 4R of the fourth line. In this instance, the 3D formatter outputs a value obtained by calculating the left eye image data 1L, 2L, and 3L of the first, second, and third lines using a weight value 4:2:1 as left eye image data 1L of the first line. The 3D formatter outputs a value obtained by calculating the right eye image data 1R, 2R, 3R, and 4R of the first, second, third, and fourth lines using a weight value 2:4:2:1 as right eye image data 2R of the second line. The 3D formatter outputs a value obtained by calculating the left eye image data 1077L, 1078L, 1079L, and 1080L of the 1077th, 1078th, 1079th, and 1080th lines using a weight value 1:2:4:2 as left eye image data 1079L of the 1079th line. The 3D formatter outputs a value obtained by calculating the right eye image data 1078R, 1079R, and 1080R of the 1078th, 1079th, and 1080th lines using a weight value 1:2:4 as right eye image data 1080R of the 1080th line.

FIG. 8B illustrates the 3D format method of the 3D formatter, which outputs a value obtained by calculating the left eye image data of the (n−2)th, (n−1)th, nth, (n+1)th, and (n+2)th using the weight value 1:2:4:2:1 as left eye image data of the nth line and outputs a value obtained by calculating the right eye image data of the (n−1)th, nth, (n+1)th, (n+2)th, and (n+3)th lines using the weight value 1:2:4:2:1 as right eye image data of the (n+1)th line. Other weight values may be used. Namely, the 3D formatter may output a value obtained by calculating the left eye image data of the (n−2)th, (n−1)th, nth, (n+1)th, and (n+2)th lines using a weight value v:w:x:y:z (where v, w, x, y, and z are a positive number) as left eye image data of the nth line and may output a value obtained by calculating the right eye image data of the (n−1)th, nth, (n+1)th, (n+2)th, and (n+3)th lines using the weight value v:w:x:y:z as right eye image data of the (n+1)th line.

In other words, as shown in FIG. 8B, the embodiment of the invention converts the left eye image data of the nth line using the left eye image data of the (n−2)th, (n−1)th, nth, (n+1)th, and (n+2)th lines and converts the right eye image data of the (n+1)th line using the right eye image data of the (n−1)th, nth, (n+1)th, (n+2)th, and (n+3)th lines. Then, the embodiment of the invention arranges the left eye image data on the odd-numbered lines of the display panel and arranges the right eye image data on the even-numbered lines of the display panel. As a result, the embodiment of the invention may reflect the non-displayed left eye image data of the even-numbered lines on the displayed left eye image data of the odd-numbered lines and may reflect the non-displayed right eye image data of the odd-numbered lines on the displayed right eye image data of the even-numbered lines. Thus, the embodiment of the invention may smoothly represent the boundary of the 3D image and may prevent the jagging of the 3D image.

Figure 9A:
FIGS. 9A to 9E illustrate a 3D image formatted by the 3D format methods according to the first to fourth embodiments of the invention.
Figure 9B:
Figure 9C:
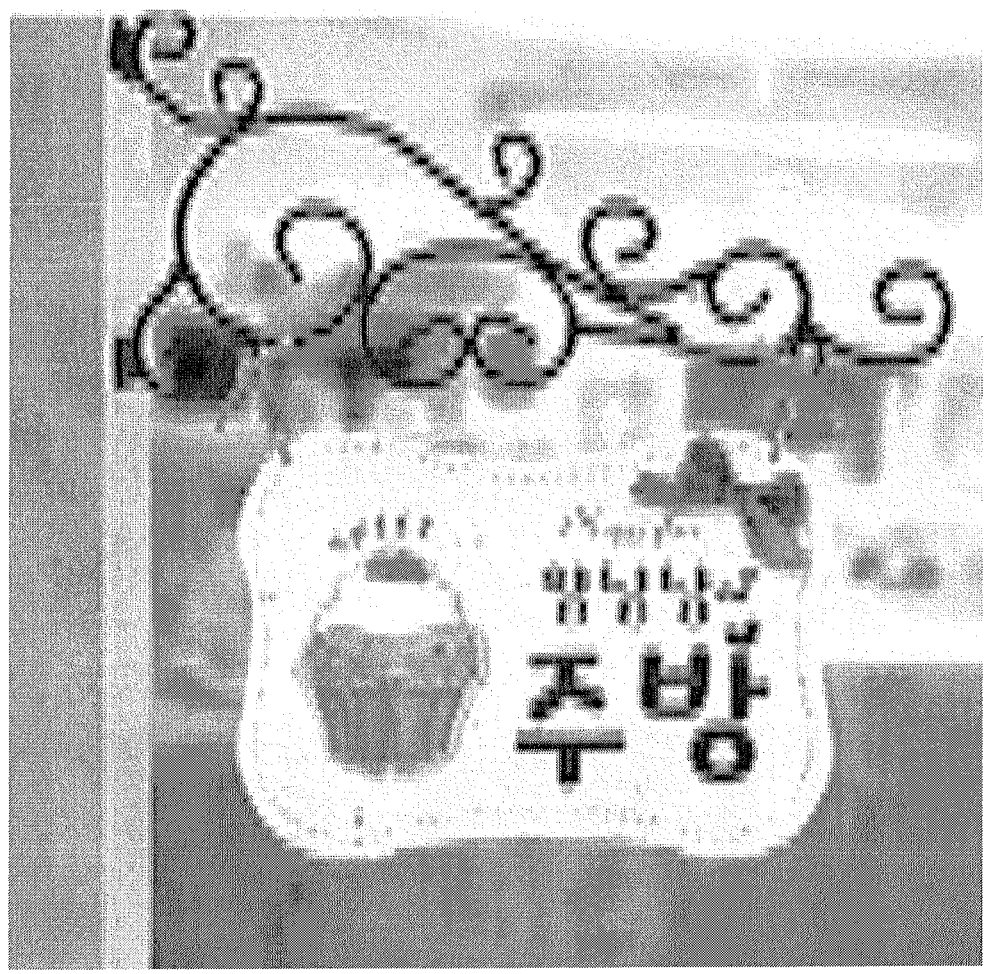
Figure 9D:
Figure 9E:
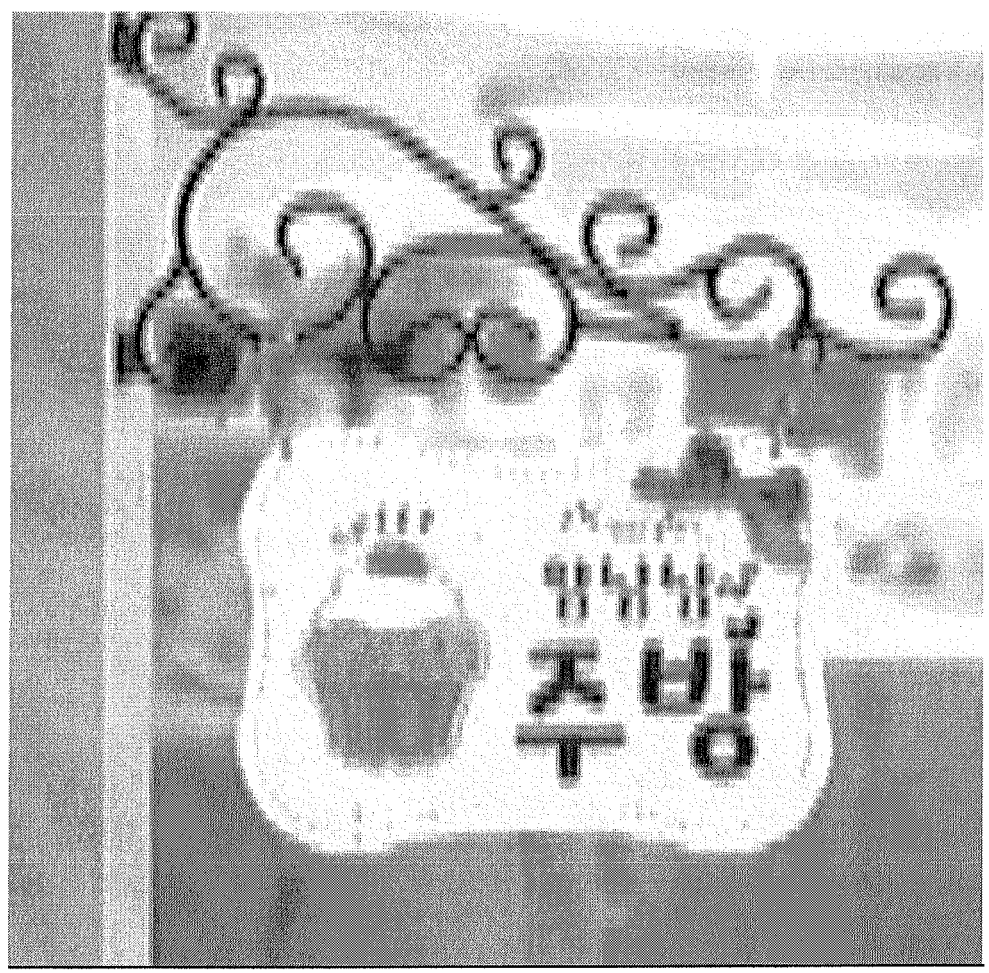

FIGS. 9A to 9E illustrate a 3D image formatted by the 3D format methods according to the first to fourth embodiments of the invention. More specifically, FIG. 9A illustrates an original image; FIG. 9B illustrates a 3D image formatted by the 3D format method according to the first embodiment of the invention; FIG. 9C illustrates a 3D image formatted by the 3D format method according to the second embodiment of the invention; FIG. 9D illustrates a 3D image formatted by the 3D format method according to the third embodiment of the invention; and FIG. 9E illustrates a 3D image formatted by the 3D format method according to the fourth embodiment of the invention.

As shown in FIGS. 9A to 9E, the jagging is gradually improved in order of the image of FIG. 9B, the image of FIG. 9C, the image of FIG. 9D, and the image of FIG. 9E. Namely, the jagging in the image of FIG. 9E is most greatly improved. Further, a blur is gradually improved in order of the image of FIG. 9E, the image of FIG. 9D, the image of FIG. 9C, and the image of FIG. 9B. Namely, the image of FIG. 9B is most definitely displayed, and the image of FIG. 9E is most blurrily displayed.

As a whole, the jagging and the blur conflict with each other. For example, the jagging in the image of FIG. 9E is most greatly improved, but the image of FIG. 9E is most blurrily displayed. Further, the jagging in the image of FIG. 9B is slightly improved, but the image of FIG. 9B is most definitely displayed.

The user may select the 3D image selection mode through the user input device 160 and may select one of the 3D format methods according to the first to fourth embodiments of the invention in the 3D image selection mode. Thus, the user may select the 3D format method according to the desired image among the images of FIGS. 9B to 9E and may view an image with the good image quality implemented by the desired 3D format method. Hence, the user satisfaction can increase.

So far, the embodiments of the invention described the 3D format methods, in which the vertical resolution of the display panel is 1080, the left eye image data is arranged on the odd-numbered lines of the display panel, and the right eye image data is arranged on the even-numbered lines of the display panel. However, the embodiments of the invention are not limited thereto. For example, other vertical resolutions may be used. Further, the right eye image data may be arranged on the odd-numbered lines of the display panel, and the left eye image data may be arranged on the even-numbered lines of the display panel.

As described above, the stereoscopic image display according to the embodiment of the invention converts left eye image data of an nth line by calculating left eye image data of at least two neighboring lines including the nth line using a predetermined weight value and converts right eye image data of an (n+1)th line by calculating right eye image data of at least two neighboring lines including the (n+1)th line using the predetermined weight value. Further, the stereoscopic image display according to the embodiment of the invention arranges the left eye image data on the odd-numbered lines of the display panel and arranges the right eye image data on the even-numbered lines of the display panel. As a result, the stereoscopic image display according to the embodiment of the invention may reflect the non-displayed left eye image data of the even-numbered lines on the displayed left eye image data of the odd-numbered lines and may reflect the non-displayed right eye image data of the odd-numbered lines on the displayed right eye image data of the even-numbered lines. Hence, the stereoscopic image display according to the embodiment of the invention may prevent the jagging. Further, the stereoscopic image display according to the embodiment of the invention may select one of a jagging improvement image and a blur improvement image based on the user's preference. As a result, the stereoscopic image display according to the embodiment of the invention may increase the user satisfaction for image quality.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A stereoscopic image display comprising:
  a display panel configured to display a left eye image on odd-numbered lines and display a right eye image on even-numbered lines;
  a patterned retarder including a first retarder passing through first polarized light of the left eye image and a second retarder passing through second polarized light of the right eye image; and
  a 3D formatter configured to receive 3D image data from a host system, assign left eye image data of the 3D image data to the odd-numbered lines, and assign right eye image data of the 3D image data to the even-numbered lines,
  wherein the 3D formatter converts left eye image data of an nth line by calculating left eye image data of at least two neighboring lines including the nth line using a predetermined weight value, where n is a natural number,
  wherein the 3D formatter converts right eye image data of an (n+1)th line by calculating right eye image data of at least two neighboring lines including the (n+1)th line using the predetermined weight value.

2. The stereoscopic image display of claim 1, wherein the 3D formatter outputs a value obtained by calculating left eye image data of an (n−1)th line and the nth line using a weight value x:y as the left eye image data of the nth line, where x and y are a positive integer, and
  wherein the 3D formatter outputs a value obtained by calculating right eye image data of the nth and (n+1)th lines using the weight value x:y as the right eye image data of the (n+1)th line.

3. The stereoscopic image display of claim 2, wherein the weight value x:y is 1:1.

4. The stereoscopic image display of claim 1, wherein the 3D formatter outputs a value obtained by calculating left eye image data of the nth and (n+1)th lines using a weight value x:y as the left eye image data of the nth line, where x and y are a positive integer, and
  wherein the 3D formatter outputs a value obtained by calculating right eye image data of the (n+1)th line and an (n+2)th line using the weight value x:y as the right eye image data of the (n+1)th line.

5. The stereoscopic image display of claim 4, wherein the weight value x:y is 1:1.

6. The stereoscopic image display of claim 1, wherein the 3D formatter outputs a value obtained by calculating left eye image data of an (n−1)th line, the nth line, and the (n+1)th line using a weight value x:y:z as the left eye image data of the nth line, where x, y, and z are a positive integer, and
  wherein the 3D formatter outputs a value obtained by calculating right eye image data of the nth line, the (n+1)th line, and an (n+2)th line using the weight value x:y:z as the right eye image data of the (n+1)th line.

7. The stereoscopic image display of claim 6, wherein the weight value x:y:z is 1:2:1.

8. The stereoscopic image display of claim 1, wherein the 3D formatter outputs a value obtained by calculating left eye image data of an (n−2)th line, an (n−1)th line, the nth line, and the (n+1)th line using a weight value w:x:y:z as the left eye image data of the nth line, where w, x, y, and z are a positive integer, and
  wherein the 3D formatter outputs a value obtained by calculating right eye image data of the (n−1)th line, the nth line, the (n+1)th line, and an (n+2)th line using the weight value w:x:y:z as the right eye image data of the (n+1)th line.

9. The stereoscopic image display of claim 8, wherein the weight value w:x:y:z is 1:4:4:1.

10. The stereoscopic image display of claim 1, wherein the 3D formatter outputs a value obtained by calculating left eye image data of an (n−1)th line, the nth line, the (n+1)th line, and an (n+2)th line using a weight value w:x:y:z as the left eye image data of the nth line, where w, x, y, and z are a positive integer, and
  wherein the 3D formatter outputs a value obtained by calculating right eye image data of the nth line, the (n+1)th line, the (n+2)th line, and an (n+3)th line using the weight value w:x:y:z as the right eye image data of the (n+1)th line.

11. The stereoscopic image display of claim 10, wherein the weight value w:x:y:z is 1:4:4:1.

12. The stereoscopic image display of claim 1, wherein the 3D formatter outputs a value obtained by calculating left eye image data of an (n−2)th line, an (n−1)th line, the nth line, the (n+1)th line, and an (n+2)th line using a weight value v:w:x:y:z as the left eye image data of the nth line, where v, w, x, y, and z are a positive integer, and
  wherein the 3D formatter outputs a value obtained by calculating right eye image data of an (n−1)th line, the nth line, the (n+1)th line, the (n+2)th line, and an (n+3)th line using the weight value v:w:x:y:z as the right eye image data of the (n+1)th line.

13. The stereoscopic image display of claim 12, wherein the weight value v:w:x:y:z is 1:2:4:2:1.

14. The stereoscopic image display of claim 1, wherein the display panel is implemented as one of a liquid crystal display (LCD) panel, a field emission display (FED) panel, a plasma display panel (PDP) display, and an organic light emitting diode (OLED) display panel.

15. The stereoscopic image display of claim 1, further comprising polarized glasses including a left eye polarizing filter passing through the first polarized light, and a right eye polarizing filter passing through the second polarized light.

16. The stereoscopic image display of claim 1, further comprising a user input device used to select a 3D image selection mode,
  wherein the 3D formatter selects the at least two neighboring lines including the nth line or the (n+1)th line based on the 3D image selection mode selected through the user input device.

* * * * *